US00RE40142E

(19) United States
(12) Reissued Patent
Fous

(10) Patent Number: US RE40,142 E
(45) Date of Reissued Patent: Mar. 11, 2008

(54) ERGONOMIC FIELDING GLOVE

(76) Inventor: Robert M. Fous, 702 SW. 48th Ave., Portland, OR (US) 97221

(21) Appl. No.: 10/662,036

(22) Filed: Sep. 11, 2003

Related U.S. Patent Documents

Reissue of:
(64) Patent No.: 6,289,515
Issued: Sep. 18, 2001
Appl. No.: 09/472,743
Filed: Dec. 27, 1999

U.S. Applications:
(60) Provisional application No. 60/118,543, filed on Feb. 4, 1999.

(51) Int. Cl.
*A41D 13/08* (2006.01)

(52) U.S. Cl. ..... 2/19
(58) Field of Classification Search ..... 2/19, 2/159, 161.1
See application file for complete search history.

(56) References Cited

U.S. PATENT DOCUMENTS

| | | | | | |
|---|---|---|---|---|---|
| 1,562,176 | A | * | 11/1925 | Latina | 2/19 |
| 2,324,219 | A | * | 7/1943 | Latina | 2/19 |
| 4,541,127 | A | * | 9/1985 | Gould | 2/19 |
| 4,908,880 | A | * | 3/1990 | Clevenhagen | 2/19 |
| 5,155,864 | A | * | 10/1992 | Walker et al. | 2/18 |
| 5,544,362 | A | * | 8/1996 | Synek | 2/19 |
| 5,671,477 | A | * | 9/1997 | Aoki | 2/19 |
| 5,878,436 | A | * | 3/1999 | Jones | 2/19 |
| 6,536,046 | B1 | * | 3/2003 | Gilligan | 2/19 |
| 2004/0068777 | A1 | * | 4/2004 | Wheelington, II | 2/161.1 |

* cited by examiner

*Primary Examiner*—Gary L. Welch
*Assistant Examiner*—Andrew W. Sutton
(74) *Attorney, Agent, or Firm*—Robert E. Howard

(57) ABSTRACT

A fielding glove has an outer shell having at least one finger portion, a thumb portion, and a web joining the thumb portion and the nearest finger portion; a mitten compartment that holds all four fingers, positioned and fixed upon or within the outer shell at an angle of approximately 40 degrees in relation to the upright finger portion(s) of the outer shell of the glove, and a thumb compartment that is rotated forward in a approximately 20 degree arc from the plane of the finger portions of the mitten, and maintains a fixed angle between the thumb and index finger within said mitten of approximately 90 degrees. In addition, to accommodate the ergonomic alignment of the mitten portion, the entrance for the hand into the mitten compartment, on or within the glove must also align at the same approximately 40 degrees, from the upright "finger" portion of the glove. Within the mitten compartment for the fingers and thumb, leather or other material, would form a strap that creates a loop where one or more fingers could be inserted within. As well there is a web/pocket area within the overall dimensions of the glove that has an expanded area where the hand will not be impacted by a hit or thrown ball. A section of the finger portion of the outersell glove, adjacent to the web is molded and shaped to conform to the spherical dimensions of a particular ball for which the glove will be used. There is also provided a flexible web with a hollow ring in the center of the web area, with straps of material that radiate out from the ring to the edges of the finger and thumb portion and to a span of material that spans the finger and thumb portion.

13 Claims, 2 Drawing Sheets

ERGONOMIC FILEDING GLOVE

PARTIALLY CUT AWAY PERSPECTIVE - BACK SIDE

ERGONOMIC FILEDING GLOVE

PARTIALLY CUT AWAY PERSPECTIVE - BACK SIDE

ERGONOMIC FILEDING GLOVE

PERSPECTIVE VIEW - FRONT SIDE

ERGONOMIC FIELDING GLOVE

Matter enclosed in heavy brackets [ ] appears in the original patent but forms no part of this reissue specification; matter printed in italics indicates the additions made by reissue.

This application is based on the provisional application titled: Two fingerbaseball/softball fielding glove, file dated Feb. 4, 1999, application No. 60/118,643, and the patent application Ser. No. 09/472,743 dated Dec. 27, 1999

BACKGROUND OF THE INVENTION

This invention relates generally to the field of athletic equipment, and more particularly to an ergonomic fielding glove to be used in sports such as baseball, softball or the like.

Traditional four finger and three finger baseball or softball fielding gloves are designed along the form of an open hand. The glove is made with an outer shell and an inner compartment that contains the hand and positions it within the glove with the fingers extending into the finger slots of the outer shell. If you remove the glove from the hand, and view the hand as it was positioned in the glove, the thumb of the hand is rotated forward towards the palm at approximately 45 degrees from the plane of the hand and fingers. The fourth finger is also drawn forward slightly, positioned so that the thumb and fourth finger, when drawn towards each other, act to close the outer, vertical edges of the glove. The first, second and third fingers of the hand within the glove can close down around a ball, with a small amount of force but have little effect on the actual closing of the glove's outer vertical edges. The action of closing the glove's outer vertical edges, seals the ball inside the glove, after it is caught. This action is similar to closing a bare hand around a round object. The thumb and fourth finger close towards each other around the outside of the ball, the three fingers between the thumb and fourth finger close over the top. This limits the main force of closure to the thumb and the fourth, or smallest finger.

The positioning of the hand within the previously designed three or four fingered baseball/softball fielding gloves, overall, forms a pocket in the palm of the hand. Within the glove the palm of the hand is centered in the pocket of the glove. Between the valley of the thumb slot and index or first finger slot of the outer shell of the glove is the web. The fixed angle between the thumb and index finger within the outer shell of the glove is approximately 55 degrees in a traditional baseball/softball fielding glove.

In these previous fielding glove designs, the only surface area of the glove where the hand is not exposed to the force of the ball striking it is the web and the extended length of each of the glove's fingers. The palm of the glove and the web are the area where most of the balls are caught within the glove. The ball is either caught entirely in the pocket, or strikes the pocket and glances up into the web, or can be caught entirely in the web. A high percentage of time the ball strikes the pocket, and consequently the palm of the hand and fingers. Players wearing a previously designed glove frequently experience bruises, swelling, pain, and in some cases more serious damage from the impact of the ball striking the glove in the pocket area. Fielders wearing these previously designed gloves often removed their index finger from within the index finger slot and placed it outside the glove, against the back of the index finger slot, to put a little more padding between their finger and the impact of the ball striking the glove. Eventually manufacturers began cutting a hole in the back of the index finger slot to accommodate removal of the index finger from within the slot. Various padded inserts have been used to try to reduce the impact of a ball striking the pocket, and consequently the palm of the hand.

SUMMARY OF THE INVENTION

The primary object of the invention is to increase the closing pressure of a fielding glove catching a ball, decreasing the ball's tendency to pop loose when fielded or applying a tag to a base runner.

Another object of the invention is to decrease exposure and damage to the palm of the hand from the blunt force of a rapidly moving ball striking the pocket of the glove.

Another object of the invention is to reduce the tendency of a ball is ricochet out of the web area of the glove.

Another object of the invention relating to the starweb design is to reduce the number of pieces, dye cuts, stitching and labor needed to construct the web portion of the glove.

In accordance with a preferred embodiment of the present invention, a fielding glove comprises an outer shell having at least one finger portion, a thumb portion, and a web joining the thumb portion and the nearest finger portion; a mitten compartment that holds all four fingers, positioned and fixed upon or within the outer shell at an angle of approximately 40 degrees in relation to the upright finger portions of the outer shell of the glove, and a thumb compartment that is rotated forward in a approximately 20 degree arc from the plane of the finger portion of the mitten, and maintains a fixed angle between the thumb and index finger within said mitten of approximately 90 degrees. In addition, to accommodate the ergonomic alignment of the mitten portion, the entrance for the hand into the mitten compartment, on or within the glove must also align at the same approximately 40 degrees, from the upright finger portions of the glove. Within the mitten compartment for the fingers and thumb, leather or other material would form a loop in each compartment where one or more fingers or a thumb could be inserted within to provide added leverage for closing the glove.

In a further embodiment of the invention, the mitten compartment for the fingers could include segmented compartments within the mitten for one, two, or three fingers, or could be designed to hold all four fingers.

In a further embodiment, the fielding glove has a billowing, flexible web/pocket area, consisting of a web attached between and slightly larger than the span between the thumb and first finger portion of the aforementioned outer shell. In addition, a molded or shaped concave indentation is created by a standdard leather molding process into the finger portion of the outershell that represents the non web portion of the web/pocket area. This area is molded in the same proportions as the web portion of said web/pocket area, that conforms to the spherical shape and dimension of a baseball or softball, as desired.

In yet a further embodiment, the fielding glove has a star shaped web, made with a central hollow ring of an appropriate material, with a diameter such to prevent the passage of a ball completely through the ring. Each leg of the starweb, is a single strap of material that is passed through and folded back over the ring, both ends of the single strap then attach to the outer edges of the valley between the thumb and finger portions, and the span of material that bridges the top of the valley between the thumb and finger portion, to form the legs of the star shaped web.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The following description of the preferred embodiment is for a right-handed person having the fielding glove on the left hand. It will be appreciated that the invention may be adapted to a left-handed person having the fielding glove on the right hand.

Figure 1:
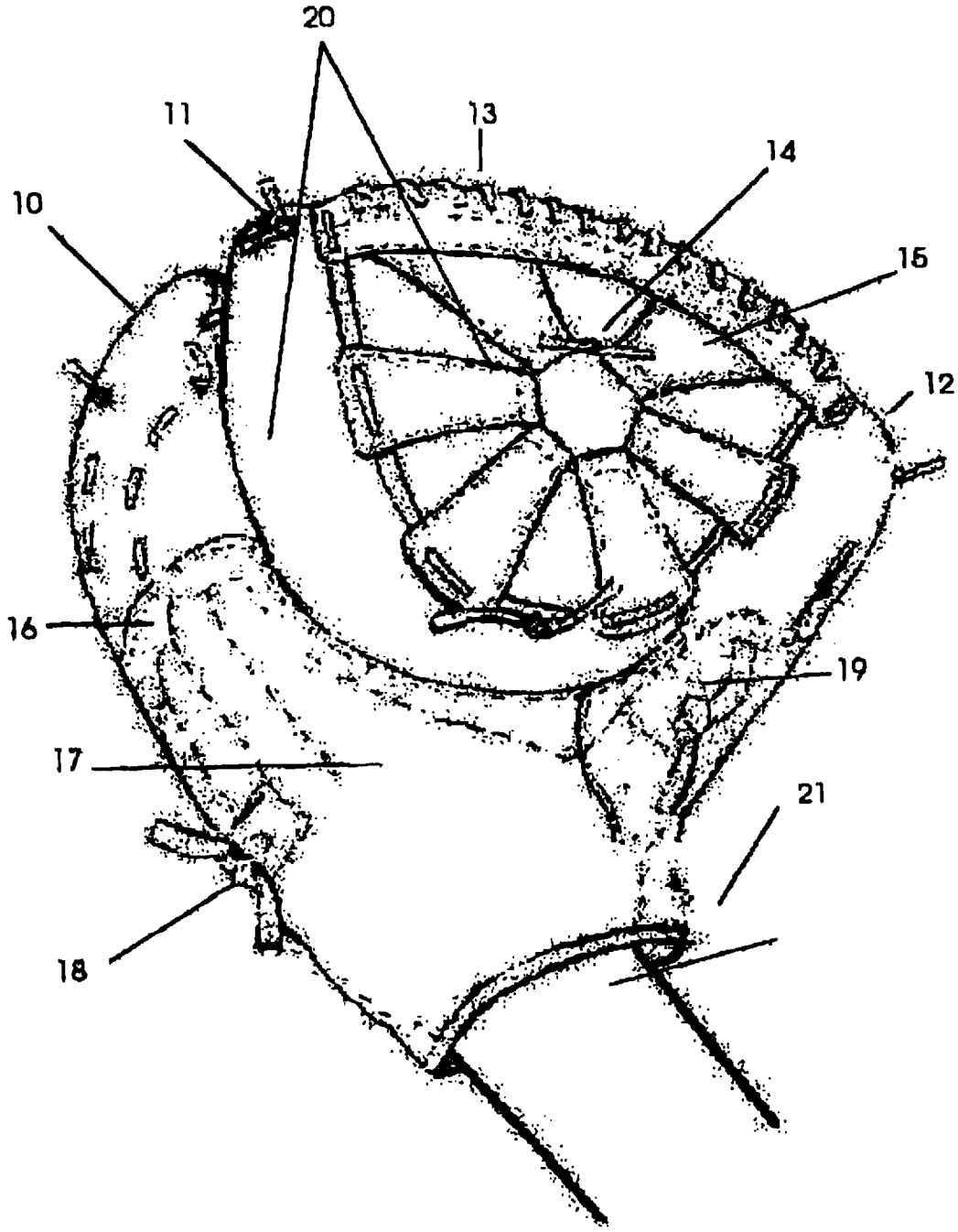
FIG. 1 is a partially cut-away perspective view of the backside of the ergonomic fielding glove according to a preferred embodiment of the present invention.
Figure 2:
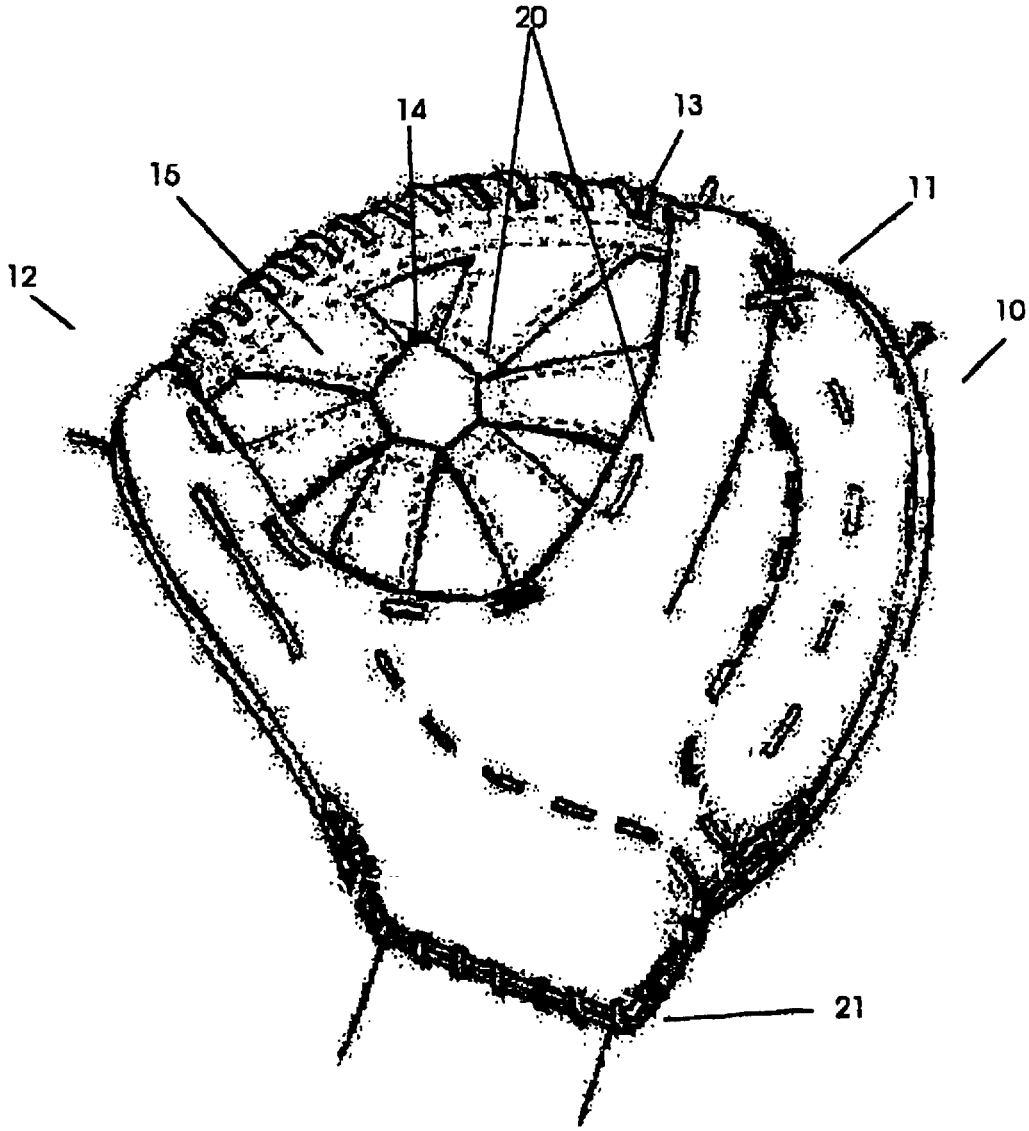
FIG. 2 is a perspective view of the front side of the embodiment of FIG. 1.

As the preferred embodiment shown in FIG. 1, the geometry of the hand's position within the outer shell of the fielding glove is realigned from that of the conventional glove design. The typical finger slots in the outer shell of conventional gloves have been replaced by a finger portion or portions, and in the illustrated embodiment shows to finger portions 10, 11, aligned next to each other. The first finger portion adjacent to the web 15, comprises, along with the web, the web/pocket area 20 of the glove. A separate mitten shaped finger compartment 16 inside or surface mounted upon the outer shell is designed to accommodate all four fingers 17, and is ideally aligned at an angle of approximately 40 degrees in relation to the two upright finger portions 10, 11 of the glove's outer shell. The fingers of the hand are positioned within the mitten 17 and shown in FIG. 1 by the dotted lines. The mitten is positioned within or upon the outer shell glove. The angle between the thumb and index finger in the mitten is approximately 90 degrees with the thumb rotated forward in an arc of approximately 20 degrees from the plane of the hand. When they close, all four fingers of the hand are moving towards the thumb and vice-versa. This movement closes the outer edge of the outer shell glove's outside finger portion edge 10 towards the edge of the outer shell's thumb portion 12 with approximately 4 times the closing pressure of a conventional baseball/softball fielding glove. This improvement in closing leverage, reduces the tendency of the ball to escape the glove when catching a thrown or hit ball, or when applying a tag to a base runner. The more force applied to closure the less likely the ball will pop loose.

The angle between the thumb and index finger within the ergonomic fielding glove is increased from approximately 55 degrees in a traditional baseball/softball glove to approximately 90 degrees. The increased angle between the thumb and index finger within the interior mitten, the realignment of the entire hand within the mitten compartment 16 at an approximately 40 degree angle to the upright finger portions, as well as the fact that all four fingers are now closed together rather than widely separated by the individual finger slots of a traditional glove, increases the area of the pocket where there will be no impact on the hand from a hiit or thrown ball.

This new ergonomic design increases the volume of the pocket and web area, and reduces the surface area that exposes the palm and fingers to damage from a high velocity, hard ball striking the palm in the pocket of the glove by approximately 30%. The potential damage to the palm or fingers of the hand is greatly lessened. This design reduces the tendency of the ball impacting and damaging the palm of the hand or the fingers because there is additional room to catch the ball within the web/pocket area 20 where the palm is not exposed.

Turning to the billowing web/pocket area 20 in the preferred embodiment, it has a star shape with a central ring of leather or other suitable material 14 said ring located in the approximate center of the web 15. Attached to the ring, by any suitable means are strands of leather or other material, of a proper width and spaced apart radially, so that no opening between the strands would allow a hit or thrown ball to escape through the opening. The strandsradiate out to the interior edges of the outer shell thumb portion and first finger portion. The strands are attached to the edges of the thumb and finger portions of the glove by stitching or appropriate means. The star web 15 also has a bridge of material 13 that spans the upper edge of the thumb and first finger portions. The web area 15 could also employ a standard web drawn from the many varieties in the public domain. By removing the first finger portion 11 from the outershell glove FIG. 1, the star or other web could be expanded proportionally to fill the larger opening made by the removal of the first finger portion to span the entire web/pocket area 20, without altering the intent of the star web invention.

The billowing web/pocket area 20 allows for a netting effect to trap the ball and reduce ricochet. The netting effect is accomplished by making the web 15 of a flexible material whose radial dimensions exceed the surface area in the space created by the valley between the first finger portion and thumb portion of the outershell. The radial dimensions are of sufficient proportion to allow flexibility in the web material, reducing the web's resilience, thereby reducing the tendency of the web to spring back upon impact by a ball, and lessening the forces which may cause the ball to ricochet off the web and out of the glove. The star web 15 would have a donut shaped ring 14 of leather or other appropriate material in the center of the web, with the legs of the web being a leather or other appropriate material that looped around the ring, then radiated back to the edges of the glove in a star pattern. The legs of the star are attached to the finger portion, thumb portion, and bridge span, where they intersect, by leather chords or other suitable material.

The first finger portion 11, when utilized as in this embodiment as a part of the web/pocket area, is designed, to omit any portion of the fingers or hand from that finger portion, and to consequently billow and flex upon the impact of a ball. In this embodiment, the first finger portion 11 can be made of a flexible material that will absorb to a certain extent, the energy of the impact of a ball and reduce it's tendency to ricochet out of the glove, according to the same principles and in cooperation with those employed by the starweb 15.

As well the first finger portion 11, could be a molded piece, as depicted in FIG. 1, using standard material molding techniques, that concaves towards the back of the glove in the approximate proportions of the ball for which the glove is intended to be used. This concave curvature in the flexible material of the first finger portion 11, also serves to redirect and disperse the energy created by the impact of a ball within the web/pocket area.

In the preferred embodiment as displayed, within the thumb portion of the mitten 16 is an adjustable thumb strap 19 of leather or other appropriate material for added leverage and comfort of a particular size hand. A similar strap 18 is located on the outer edge of the finger portion of the mitten compartment 16 to accommodate one or more fingers for a similar purpose as described for the thumb. In the preferred embodiment, it is shown enclosing the third and fourth fingers.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A [fielding glove] *baseball or softball glove* comprising:

an outer shell having at least one *upright* finger portion, [a] *an outer shell* thumb portion, and a web joining the thumb portion and the nearest *upright* finger portion;

a mitten shaped compartment [that in part holds] *having a mitten finger portion or portions adapted to receive a user's* four fingers, [comprised of leather or other appropriate material,] *said mitten shaped compartment* positioned and fixed upon or within the outer shell of the glove so that the *mitten* finger portion or portions [of the mitten] are aligned at an angle of approximately 40 degrees in relation to the upright finger portion [of the outershell glove];

[a thumb compartment of said mitten that is rotated forward in an approximately 20 degree arc from the plane of the finger portion of the mitten; and] *said mitten shaped compartment having a mitten thumb portion adapted to receive a user's thumb, wherein* a fixed angle of approximately 90 degrees *is* between the mitten['s] thumb [compartment in its rotated position] *portion* and the [index] *nearest mitten* finger portion [within said mitten]; *and*

[a thumb portion of the outershell glove rotated forward in an arc of approximately 20 degrees from the plane of the finger portion of the outershell to conform to the chosen arc of the thumb portion of the mitten;

an opening for the hand into the mitten aligned in an approximately 40 degree angle to the upright finger portion of the outershell glove, and;

a web/pocket area of the outershell glove, within the valley between the thumb and first finger portion, that reduces the surface area where a hit or thrown ball impacts the user's hand.]

*a mitten opening for inserting a portion of a user's hand into the mitten shaped compartment.*

2. A fielding glove as claimed in claim 1 wherein said web comprises a donut shaped hollow ring, centered in the aforementioned valley between the thumb portion and nearest finger portion of the outer shell glove, with straps attached to the ring that radiate out from the circumference of the ring in a star pattern attaching to various points along the edges of the aforementioned thumb and index finger and to a strap the bridges the tips of the thumb and nearest finger.

3. A fielding glove as claimed in claim 1 with a least one independent finger portion molded or shaped from the top to the bottom of said finger portion, in a concave shape in the approximate proportions or larger, than the ball size for which the glove is intended to be used.

*4. A glove of claim 1, wherein said mitten finger portion or portions extend only about midway between said mitten opening and an outer end of said upright finger portion.*

*5. A glove of claim 1, wherein said mitten thumb portion is rotated forward along an approximately 20 degree arc from the plane of the mitten finger portion.*

*6. A glove of claim 5, wherein said outer shell thumb portion is rotated forward in an arc that conforms to the arc of the mitten thumb portion.*

*7. A glove of claim 1, wherein said glove is a fielding glove.*

*8. A baseball or softball glove comprising:*

*an outer shell having at least one upright finger portion, an outer shell thumb portion, and a web joining the outer shell thumb portion and the nearest upright finger portion;*

*a mitten shaped compartment comprising a mitten finger portion adapted to receive the fingers of a user, and a mitten thumb portion adapted to receive the thumb of a user;*

*said mitten shaped compartment being positioned and fixed upon the outer shell of the glove and having a mitten opening at a base of said compartment for inserting a portion of said user's hand into the mitten shaped compartment;*

*said mitten shaped compartment configured to position a plurality of said fingers of the user at an angle of approximately 40 degrees in relation to the upright finger portion; and*

*said mitten shaped compartment configured to position said thumb and index finger of the user approximately 90 degrees apart.*

*9. A glove of claim 8, wherein said mitten finger portion extends only about midway between said mitten opening and an outer end of said upright finger portion.*

*10. A glove of claim 8, wherein said glove is a fielding glove.*

*11. A baseball or softball glove comprising:*

*an outer shell having an outer shell thumb portion, a web, a first upright finger portion, and one or more second upright finger portions, wherein said web and said first upright finger portion together define a pocket area positioned between said outer shell thumb portion and said second upright finger portions;*

*a mitten shaped compartment comprising a mitten finger portion adapted to receive the fingers of a user, and a mitten thumb portion adapted to receive the thumb of a user;*

*said mitten shaped compartment being positioned and fixed upon the outer shell of the glove, wherein said mitten thumb portion is positioned adjacent said outer shell thumb portion and said mitten finger portion is positioned adjacent said one or more second upright finger portions;*

*said mitten shaped compartment configured to position a plurality of the fingers of a user at an angle in relation to said upright finger portions such that the fingers of the user are pointing toward an outer side edge of said outer shell; and*

*said mitten shaped compartment is configured to position said thumb and index finger of the user approximately 90 degrees apart.*

*12. A glove of claim 11, wherein said mitten finger portion extends only a portion of the distance between a bottom edge of the glove and a top edge of the second upright finger portions.*

*13. A glove of claim 11, wherein said glove is a fielding glove.*

* * * * *